Figure 1:
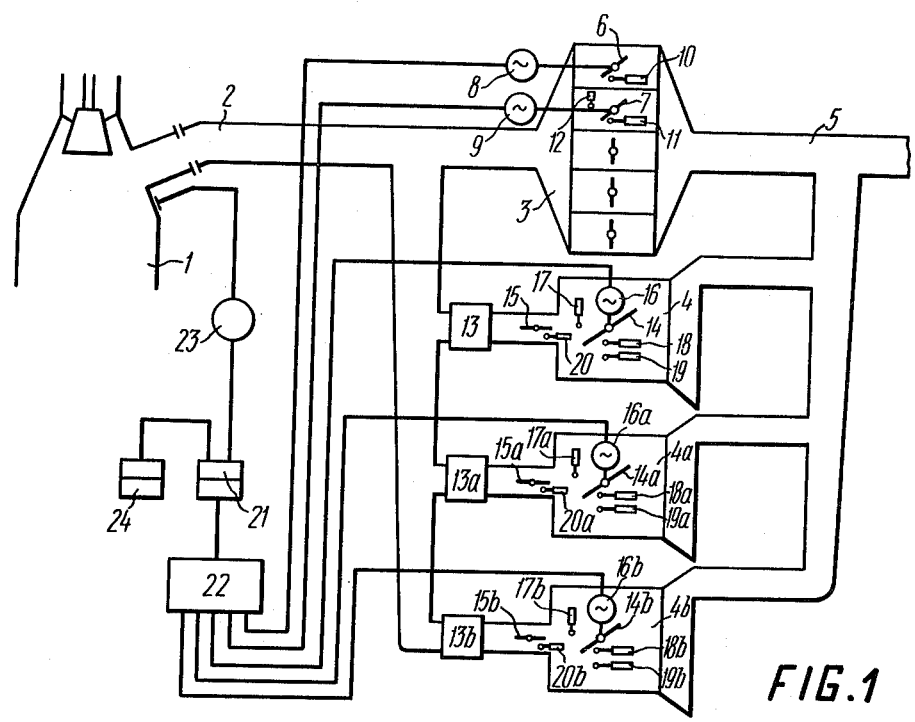

United States Patent [19]

Agranovskaya et al.

[11] 4,180,249
[45] Dec. 25, 1979

[54] INSTALLATION FOR CONTROLLING PRESSURE OF GAS UNDER SHAFT TOP IN SUPER-CAPACITY BLAST FURNACE

[76] Inventors: Miriam A. Agranovskaya, Koptevskaya ulitsa, 30, kv. 24, Moscow; Vladimir A. Babich, ulitsa Stachek, 25, kv. 33, Sverdlovsk; Felix A. Ratner, Zanevsky prospekt, 28, kv. 30, Leningrad; Alexandr S. Rozenoer, ulitsa Chekhova, 3, kv. 39, Leningrad; Moisei I. Ryvkin, prospekt Kosmonavtov, 19, korpus 1, kv. 163, Leningrad, all of U.S.S.R.

[21] Appl. No.: 924,730

[22] Filed: Jul. 14, 1978

Related U.S. Application Data

[63] Continuation of Ser. No. 668,591, Mar. 19, 1976, abandoned.

[30] Foreign Application Priority Data

Mar. 27, 1975 [SU] U.S.S.R. ................................ 2113551

[51] Int. Cl.² .............................................. C21B 7/00
[52] U.S. Cl. ...................................... 266/78; 60/39.15; 266/89; 266/155
[58] Field of Search ................ 60/39.02, 39.12, 39.15; 266/44, 78, 89, 144, 155, 159, 197

[56] References Cited
U.S. PATENT DOCUMENTS 2,701,443  2/1955  Sédille ............................ 60/39.15 X

FOREIGN PATENT DOCUMENTS 391180  12/1973  U.S.S.R. ................................ 266/89

*Primary Examiner*—Paul A. Bell
*Attorney, Agent, or Firm*—Lackenbach, Lilling & Siegel

[57] ABSTRACT

Installation includes a throttle assembly built in the blast-furnace outlet pipe and at least two gas turbines with blast furnace gas heaters also built in the outlet pipe and being parallel with the throttle assembly. Each of the gas turbines having a control diaphragm and a stop diaphragm is provided with a separate drive for turning thereof. The installation is also furnished with an isodromic regulator, for the gas pressure under the shaft top of the blast furnace, electrically connected to the separate drives of the throttles, being a part of a throttle unit and by means of a logic control unit being connected to separate drives of the control diaphragms of the gas turbines. The regulator preselects a sequence of operation of the above drives, when in the process of gas pressure control under the shaft top in the super-capacity blast furnace, to open in the first-turn the control diaphragms of the gas turbines and then to open the throttles which are a part of the throttle assembly. But when closing, the throttles are operated in the first turn and after that the control diaphragms are closed. Connected according to an electric circuit, contacts of switches are switched on by the logic control unit. The control diaphragms of the gas turbines are furnished with switches which operate when the control diaphragm turning at a position of closing up to the position corresponds to a given gas flow rate.

9 Claims, 2 Drawing Figures

INSTALLATION FOR CONTROLLING PRESSURE OF GAS UNDER SHAFT TOP IN SUPER-CAPACITY BLAST FURNACE

This is a continuation of application Ser. No. 668,591, filed Mar. 19, 1976 now abandoned.

The present invention relates to installations for controlling the pressure of gas under shaft tops in super-capacity blast furnaces employed in ferrous metallurgy.

The installation is intended for the most economical utilization of the blast-furnace gas discharge through the outlet pipe from the blast furnace to produce electric power.

Rapid growth of industry leads to increased demands for metal and this has resulted in the development of super-capacity blast furnaces with high flow rates of discharged blast-furnace gas.

Several methods of controlling the pressure of gas under the shaft top of a super-capacity blast furnace have recently been developed. One of these methods is accomplished by an installation having throttles and a gas turbine connected to the gas outlet pipe of the super-capacity blast furnace. The operation of the installation is controlled by means of an isodromic regulator for the pressure of blast-furnace gas. This regulator acts on one of the control throttles of the throttle assembly through which, bypassing the gas turbine, blast-furnace gas is exhausted at a rate of flow that ensures the specified control accuracy of the pressure of gas under the shaft top of the furnace.

The throttle assembly is formed by a number of throttles arranged in parallel with the gas turbine, and among these there are at least two control throttles with automatic drives and, usually, three remote-controlled throttles of a large diameter.

However, various difficulties arise during the process of control over the pressure of gas under the shaft top in a super-capacity blast furnace.

For instance, a considerable volume of blast-furnace gas must be constantly passed through the control throttle, which results in a reduced gas flow through the gas turbine. This leads to a reduced output of electric power production.

Moreover, when the considerably decreased flow of exhausted gas takes place, the control diaphragm of the gas turbine needs to be displaced by hand to ensure the flow of the gas passing through the control throttle at the rate essential to maintaining the specified accuracy of control.

To exclude manual operations, further improvement of control over the pressure of gas under the shaft top of a super-capacity blast furnace is necessary.

One more difficulty is that the scope of the isodromic regulator is limited by minor part of the overall gas flow, and, as a result, the operating range of the regulator proves very narrow, which diminishes the accuracy of maintaining the pressure.

Known in the art is a method that overcomes the above difficulties (see the Invention Certificate of the USSR No. 391180). This method is carried out by means of an installation including a throttle assembly, built in the blast-furnace outlet pipe, where in at least two throttles arranged in parallel have separate drives with switches operating in predetermined positions of the throttles. Connected to the gas outlet pipe in parallel with the throttle assembly is a gas turbine with a heater of the gas fed thereto. The gas turbine is furnished with a control diaphragm and a stop diaphragm which are movable with the aid of separate drives. In addition, the control diaphragm has a switch operating when the diaphragm is open. The installation is also provided with an isodromic regulator for the pressure of gas under the furnace shaft top, which is electrically connected to the separate drives of the throttles and to the control diaphragm of the utilization gas turbine through a logic control unit that specifies operational logic of said drives.

However, this installation, performing the above-mentioned method, also does not meet all the requirements for the operation of super-capacity blast furnaces, because a single gas turbine does not provide an economical utilization of a great volume of blast-furnace gas. Here, waste of blast-furnace gas through the throttle assembly takes place, which results in an inadequate utilization of blast-furnace gas energy.

With a great variation in capacity of blast furnaces, the development of utilization gas turbines with different rates of gas flow for each size of a blast furnace does not also seem proper as it involves various difficulties and a considerable rise in cost.

The reason is that the number of super-capacity blast furnaces of one size is very limited, whereas the production of gas turbines of a given size is economically justified only for a considerable batch. Otherwise, all economical advantages of production of electric power by means of an utilization gas turbine will be nullified by the high cost of each turbine.

Increased capacity of blast furnaces places higher demands of reliable operation on all their equipment. A breakdown in a high-capacity gas turbine leads to a complete discontinuance of furnace gas discharge, which will result in an emergency rise of the pressure of gas under the furnace shaft top.

Up-to-date super-capacity blast furnaces with continuous delivery of melt are especially sensible to the breakdowns of this kind whose consequences may be very grave.

The object of the invention is to overcome the above-mentioned difficulties.

The main object of the present invention is to provide an installation for controlling the pressure of gas under the shaft top of a super-capacity blast furnace that reduces the waste of blast-furnace gas through the control throttle of the throttle assembly increases the output and improves the economical characteristics in the production of electric power by gas turbines.

Another equally important object of the invention is to improve the dependability of operation of a super-capacity blast furnace.

Still another object of the invention is to widen the operational range of the regulator for the pressure of gas under the shaft top of the super-capacity blast furnace, and thus to increase the accuracy of the pressure control.

These and other objects are achieved by the development of an installation for controlling the pressure of gas under the shaft top of a super-capacity blast furnace including: a throttle assembly wherein at least two control throttles, arranged in parallel, have separate drives with switches operating in specified positions of the throttles, said throttle assembly being built in the blast-furnace outlet pipe; a gas turbine connected to the gas outlet pipe in parallel with said throttle assembly and having a heater, for the blast-furnace gas fed to the turbine a control diaphragm and a stop diaphragm provided with separate drives for turning thereof, the control diaphragm having a switch that operates upon fully opening said diaphragm; and an isodromic regulator, for the pressure of gas under the shaft top of the blast furnace, electrically connected to the separate drives of the throttles and to the drive for the control diaphragm of the gas turbine through a logic control unit controlling the sequence of operation of said drives, and in which, according to the invention, there is provided at least one more gas turbine connected to the gas outlet pipe of the super-capacity blast furnace in parallel with said gas turbine and having, like the first gas turbine, a gas heater, a control diaphragm with a separate drive connected to the output of the isodromic regulator for the pressure of gas under the shaft top, a switch that operates upon fully opening the control diaphragm, and a stop diaphragm; each gas turbine being furnished with a switch mounted on the control diaphragm of the respective gas turbine and operated by turning the control diaphragm for closing the diaphragm to the position that corresponds to the flow of gas through this turbine whose rate is slightly above that at which the gas heater is switched off; the switch of the first gas turbine having a normally closed contact incorporated in an electrical control circuit of the isodromic regulator on the line for closing the control diaphragm of the first gas turbine and a normally open contact incorporated in a similar manner in the electrical control circuit of the isodromic regulator on the line for closing the control diaphragm of a second gas turbine; and the switch of a second gas turbine also having a normally closed contact incorporated in the electrical control circuit of the isodromic regulator on its line to the separate drive for closing the control diaphragm of the second gas turbine and a normally open contact incorporated in said electrical control circuit on its line serving to control the control diaphragm of a third gas turbine, which allows successive action of the isodromic regulator on the separate drives for the control diaphragms of all said gas turbines to be carried out.

The use of additional gas turbines in the installation makes it possible to exclude the development of a more powerful utilization gas turbine, and, at the same time to reduce or wholly eliminate the waste of blast-furnace gase through the throttle assembly. An emergency breakdown of a gas turbine does not lead to a full discontinuance in furnace gas discharge, as the gas flow will pass through other operating gas turbines and through the control throttles of the throttle assembly, which will be brought into open condition upon the command of the isodromic regulator. This prevents the emergency rise in the pressure of blast-furnace gas under the shaft top of a super-capacity blast furnace and thus makes for the improved dependability of its operation.

Since the position corresponding to a gas flow through the gas turbine, whose rate exceeds by a predetermined value that at which the gas heater is switched off, is taken as a minimum value of the control diaphragm closure, the installation according to the invention widens the operational range of the isodromic regulator for the pressure of gas under the shaft top of a super-capacity blast furnace. The installation makes for more economical production of electric power by gas turbines because the isodromic regulator primarily closes the control throttles of the throttle assembly, and only after their closure produces a command signal for the closure of control diaphragms in gas turbines, which allows the use of the maximum volume of blast-furnace gas for production of electric power.

It is advisable to provide the first gas turbine with a switch mounted on the respective control diaphragms and operated when a control diaphragm is closed to the position corresponding to the idle-run conditions of the respective gas turbine, the switch having a normally open contact incorporated in an electrical control circuit on its line for opening the control throttle and being in parallel with the normally open contact of the switch that operates on opening the control diaphragm; to arrange in series with said contact a second normally open contact of the switch that operates on fully opening the control diaphragm of a second gas turbine; to provide the second gas turbine with a switch that operates once its gas turbine starts running idle, and then to provide it with a normally open contact incorporated in the electrical circuit on its line for opening the control diaphragm and being parallel to the second normally open contact of the switch that operates on fully opening the control diaphragm of the second gas turbine, and to arrange in series therewith the second normally open contact of the switch that operates on fully opening the control diaphragm of a third gas turbine; and to install one more switch, for the third gas turbine operating when the third turbine starts running idle, also having a normally open contact incorporated in the electrical control circuit for opening the control diaphragm and being in parallel with the normally open contact of the switch that operates on fully opening the control diaphragm of the third gas turbine.

The use of idle-run switches for the control diaphragm of the gas turbine makes for improved reliability of the blast furnace because when one of the gas turbines starts running idle and the gas flow passing through it sharply drops, the isodromic regulator transfers its control action in order to actuate the opening of the control diaphragm of the next gas turbine and control throttles, and thus an emergency rise of gas pressure under the shaft top of the blast furnace is prevented.

It is desirable to furnish the stop diaphragm of the first turbine with a suitable switch operating on its emergency closure and having two normally open contacts and one normally closed contact and to incorporate the first normally open contact in the electrical control circuit on its line for opening the control throttle, directly in parallel with the contact of the idle-run switch, and the second normally open contact in the electrical control circuit on its line serving to close the control diaphragm of the second gas turbine, directly in parallel with the normally open contact of the switch that operates on closing the control diaphragm of the first gas turbine, and to incorporate in series therewith the second normally open contact of the switch that operates on closing of the control throttle, and to incorporate the normally closed contact of the switch directly in the electrical control circuit of the isodromic regulator on the line that serves to control the drive for the control diaphragm of the first gas turbine for closing thereof; and on the stop diaphragm of the second gas turbine to provide for a switch also having two normally open contacts and one normally closed contact, to incorporate the first normally open contact in the electrical control circuit on its line serving to open the control diaphragm of the first gas turbine, directly in parallel with the normally open contact of the idle-run switch for the second gas turbine, to incorporate the second normally open contact in the electrical control circuit on its line for closing the control diaphragm of the third gas turbine, directly in parallel to the normally open contact of the switch that operates on closing the control diaphragm of the second gas turbine, and to incorporate in series therewith the second normally open contact of the switch that operates on closing the control diaphragm of the first gas turbine, and to incorporate the normally closed contact of said switch directly in the electrical control circuit on its line for closing, and a stop diaphragm of the third gas turbine having a switch with a normally open contact incorporated in the electrical control circuit on its line for opening the control diaphragm of the second gas turbine, directly in parallel with the normally open contact of the idle-run switch for the third gas turbine and one normally closed contact incorporated directly in the electrical control circuit for closing the control diaphragm of the third gas turbine.

The use of switches on stop diaphragms of each gas turbine allows the reliable operation of a super-capacity blast furnace to be improved, since once an emergency closure of the stop diaphragm in one of the utilization gas turbines and, correspondingly, a total discontinuance in flow of blast-furnace gas through it occurs, the transfer of the control action by the isodromic regulator on opening the control diaphragm of the next gas turbine and the control throttles makes it possible to fully prevent or, at least, lessen the effect of the rise in the pressure of gas under the shaft top of a super-capacity blast furnace.

Figure 2:
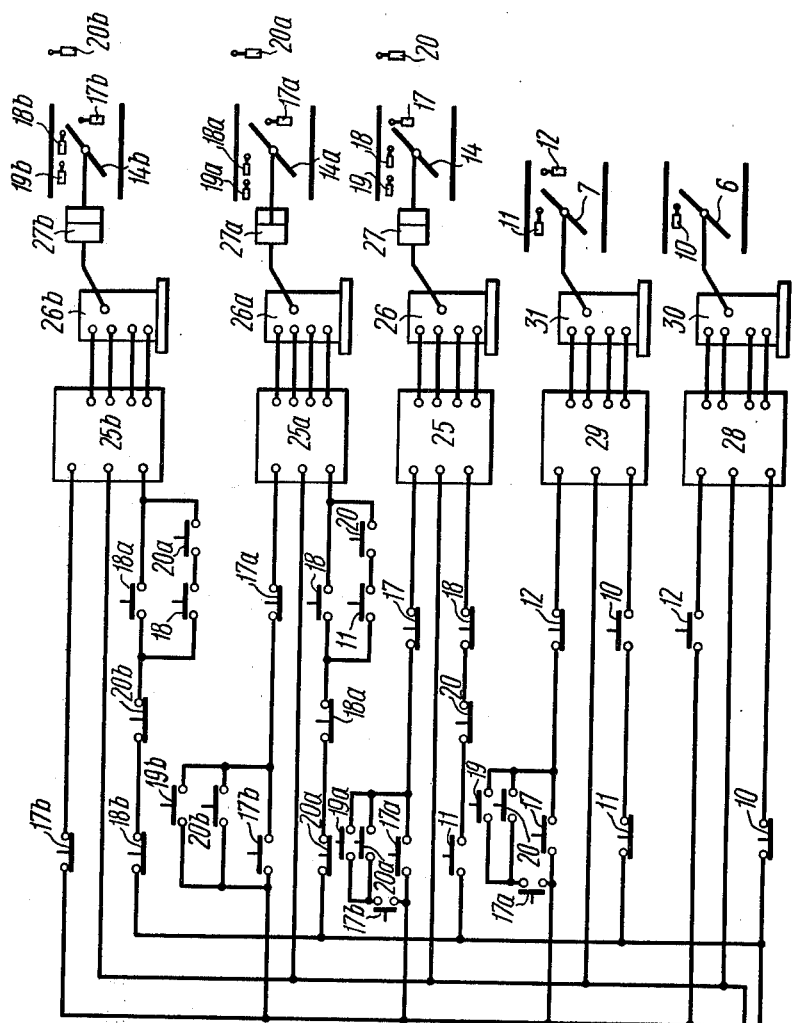

In order that the invention may be fully understood, an embodiment of the installation for controlling the pressure of gas under the shaft top of the super-capacity blast furnace according to the invention will now be described with reference to the accompanying drawings, in which:

FIG. 1 is a schematic diagram of the installation according to the invention; and FIG. 2 is an electrical wiring diagram of the control circuit for the installation.

The installation for controlling the pressure of gas under the shaft top in a super-capacity blast furnace 1 (FIGS. 1 and 2) includes a built-in outlet gas pipe 2 (FIG. 1), a throttle assembly 3, and in this embodiment at least three gas turbines 4, 4a and 4b are connected to said outlet gas pipe 2 in parallel with each other and with said throttle assembly 3. The outlet pipes of each gas turbine 4, 4a, and 4b, and also of the throttle assembly 3 are integrated into the main gas pipe 5, which delivers blast-furnace gas to the user (not shown in the FIGS.).

The throttle assembly 3 has at least two control throttles 6 and 7 arranged in parallel with separate drives 8 and 9 for turning the trottles. Each control throttle 6 and 7 is provided with a switch 10 and 11, which operates as the throttle is closed. In addition, the control throttle 7 is provided with a switch 12, which operates when said throttle 7 is fully open.

Each of the gas turbines 4, 4a, and 4b has a heater 13, 13a, and 13b to heat the incoming blast-furnace gas, a control diaphragm 14, 14a, and 14b, and a stop diaphragm 15, 15a, and 15b.

The control diaphragms 14, 14a, and 14b are provided with separate drives 16, 16a, and 16b, respectively, which have switches 17, 17a, and 17b operating when the respective control diaphragms are fully open, and also switches 18, 18a and 18b operating as the respective control diaphragms 14, 14a, and 14b are closed to the position which corresponds to a flow of the blast-furnace gas through the gas turbines at a rate slightly above that at which the gas heaters 13, 13a, and 13b are switched off.

The drives 16, 16a and 16b of the control diaphragms 14, 14a and 14b or the diaphragms themselves in each gas turbine 4, 4a and 4b are provided with the respective switches 19, 19a and 19b, which operate on closing the control diaphragms to the position corresponding to the idle-run conditions of each gas turbine 4, 4a and 4b.

Each stop diaphragm 15, 15a and 15b in each gas turbine 4, 4a and 4b is provided with a respective switch 20, 20a or 20b, which operates during the emergency closure of its stop diaphragm.

The installation for controlling the pressure of gas under the shaft top in the super-capacity blast furnace 1 is provided with an isodromic regulator 21 which is used to control the drives 8 and 9 of the control throttles 6 and 7 and also the drives 16, 16a and 16b of the control diaphragms 14, 14a and 14b in the gas turbines 4, 4a and 4b.

The output of the isodromic regulator 21 is connected with said drives through a logic control unit 22, and its inputs are connected with a sensor 23 of the gas pressure under the shaft top of the super-capacity blast furnace 1 and with a pre-set controller 24, which is mounted on the control board (not shown in the Figure) of the super-capacity blast furnace 1.

Each drive 16, 16a and 16b of the control diaphragms 14, 14a and 14b has a respective magnetic amplifier 25, 25a and 25b (FIG. 2), an electrical servomechanism 26, 26a and 26b and a hydraulic servomotor 27, 27a and 27b.

Each drive 8 and 9 (FIG. 1) of the control throttles 6 and 7 has a respective magnetic amplifier 28 and 29 (FIG. 2) and an electrical servomechanism 30 and 31.

The logic control unit 22 (FIG. 1) actuates the contacts of the switches, whose electrical wiring diagram will now be described in detail with reference to FIG. 2.

The output of the isodromic regulator 21 is connected by a three-wire arrangement (FIG. 1) to the inputs of the magnetic amplifiers 25, 25a, 25b, 28 and 29 (FIG. 2), which actuate the electrical servomechanisms 26, 26a, 26b, 30 and 31.

An electrical control circuit 32 is intended to transmit a signal from the isodromic regulator 21 to said magnetic amplifiers for closing the control throttles 6 and 7 or the control diaphragms 14, 14a and 14b.

An electrical control circuit 33 is intended to transmit a signal from the isodromic regulator 21 to said magnetic amplifiers for opening the control throttles 6 and 7 or the control diaphragms 14, 14a and 14b.

The electrical control circuit 32, on its line for closing the control throttle 6, incorporates the normally closed contact of the switch 10, which breaks as the control throttle 6 is closed.

The electrical control circuit 33, on its line for opening the control throttle 6, incorporates the normally open contact of the switch 12, which is closed at the full opening of said control throttle 7.

The electrical control circuit 32, on its line for closing the control throttle 7, incorporates the normally closed contact of the switch 11, which breaks as the control throttle 7 is closed, and the normally open contact of the switch 10, which closes as the control throttle 6 is closed, the contacts of the switches 10 and 11 being arranged in series.

The electrical control circuit 33, on the line used for opening the control throttle 7, incorporates the normally closed contact of the switch 12, which breaks as the control throttle 7 is opened, and the normally open contact of the switch 17, which closes at the full opening of the control diaphragm 14 of the gas burbine 4 (FIG. 1), the contacts of switches 12 and 17 being arranged in series.

The normally open contacts of the switches 19 and 20 are connected in parallel with the normally open contact of the switch 17 through the normally open contact of the switch 17a, which operates at the full opening of the control diaphragm 14a of the gas turbine 4a.

The normally open contact of the switch 19 closes as the control diaphragm 14 of the gas turbine 4 is closed to the position corresponding to the idle-run conditions, which is brought about by the action of the speed control system directly upon the hydraulic servomotor 27 (FIG. 2). The normally open contacts of the switch 20 close during an emergency closure of the stop diaphragm 15 (FIG. 1) of the gas turbine 4.

The electrical control circuit 32 (FIG. 2), on its line for closing the control diaphragm 14 of the gas turbine 4 (FIG. 1), incorporates the normally closed contact of the switch 18, the normally closed contact of the switch 20 (FIG. 2), and a normally open contact of the switch 11, operating as the control throttle 7 is opened, all these contacts being arranged in series. The normally closed contact of the switch 18 opens as the control diaphragm 14 is opened slightly to the position corresponding to a flow of gas through the gas turbine 4 (FIG. 4) whose rate is slightly above that at which the blast-furnace gas heater 13 is switched off.

The electrical control curcuit 33 (FIG. 2), on its line for opening the control diaphragm 14 of the gas turbine 4 (FIG. 1), incorporates the normally closed contact of the switch 17 and a normally open contact of the switch 17a, which closes at the full opening of the control diaphragm 14a of the gas turbine 4a, the contacts of switches 17 and 17a being arranged in series.

The normally open contacts of the switches 19a and 20a (FIG. 2) are connected in parallel with the normally open contact of the switch 17a (FIG. 2) through the normally open contact of the switch 17b, which closes at the full opening of the control diaphragm 14b of the gas turbine 4b (FIG. 1).

The normally open contact of the switch 19a closes as the contarol diaphragm 14a of the turbine 4 (FIG. 1) is closed to the position corresponding to the idle-run conditions. The normally open contact of the switch 20a closes during at an emergency closure of the stop diaphragm 15a of the gas turbine 4a.

The electrical control circuit 32 (FIG. 2), on the line for closing the control diaphragm 14a of the gas turbine 4a, incorporates the following contacts arranged in series: the normally closed contacts of the switches 20a and 18a and the normally open contact of the switch 18, which closes as the control diaphragm 14 of the gas turbine is turned.

The normally closed contact of the switch 20a opens during the emergency closure of the control diaphragm 15a (FIG. 1) of the gas turbine 4a.

The normally closed contact of the switch 18a (FIG. 2) opens as the control diaphragm 14a is closed to the position corresponding to a flow of gas through the gas turbine 4a (FIG. 1) whose rate is slightly above that at which the blast-furnace gas heater 13a is switched off.

In parallel with the normally open contact of the switch 18 (FIG. 2) are connected the series-arranged normally open contacts of the switches 11 and 20.

The electrical control circuit 33, on the line for opening the control diaphragm 14a of the gas turbine 4a (FIG. 1), incorporates the normally closed contact of the switch 17a (FIG. 2) and a normally open contact of the switch 17b, the contacts of switches 17a and 17b being connected in series.

In parallel with the normally open contact of the switch 17b are connected the normally open contacts of the switches 19b and 20b.

The normally open contact of the switch 19b closes as the control diaphragm 14b of the gas turbine 4b is partially closed to the position corresponding to the idle-run conditions. The normally open contact of the switch 20b closes during an emergency closure of the control diaphragm 15b of the gas turbine 4b.

The electrical control circuit 32, on its line for closing the control diaphragm 14b of the gas turbine 4b (FIG. 1), incorporates the following contacts, connected in series: the normally closed contacts of the switches 20b (FIG. 2) and 18b and the normally open contact of the switch 18a.

The normally closed contact of the switch 20b opens during an emergency closure of the stop diaphragm 15b (FIG. 1) of the gas turbine 4b.

The normally closed contact of the switch 18b (FIG. 2) opens as the control diaphragm 14b is opened slightly to the position corresponding to a flow of gas through the gas turbine 4b whose rate is slightly above that at which the blast-furnace gas heater 13b is switched off.

In parallel with the normally open contact of the switch 18a are connected normally open contacts of the switches 18 and 20a, which are arranged in series.

The electrical control circuit 33, on its line for opening the control diaphragm 14b of the gas turbine 4b, incorporates the normally closed contact of the switch 17b.

The installation operates as follows.

At the initial position, the control diaphragms 14, 14a and 14b and also both control throttles 6 and 7 are open, and the pressure of blast-furnace gas is equal to a set value.

When the pressure of gas under the shaft top of the blast furnace 1 drops, the isodromic regulator 21 produces a signal which enters the electrical control circuit 32 (FIG. 2) and through the normally closed contact of the switch 10 signals for the closing of the control throttle 6. The closure of the control throttle 6 causes a triggering of the switch 10 and its normally open contact closes and thereby allows the signal from the isodromic regulator 21 to pass through the electrical control circuit 32 for closing the second control throttle 7. Simultaneously, the normally closed contact of the switch 10 breaks, thereby removing the signal from the drive 8 (FIG. 1) of the control throttle 6.

The closure of the control throttle 7 causes the normally closed contact of the switch 11 to break, thereby removing the signal from the drive 9 of the control throttle 7, while the closure of the normally open contact 11 transfers the signal from the isodromic regulator 21 to the drive 16 of the control diaphragm 14 of the gas turbine 4. The control diaphragm 14 is then closed to the position where it operates the switch 18, breaking its normally closed contact and thereby removing the signal from the drive 16 of the control diaphragm 14, and closing the normally open contact, which switches the signal of the isodromic regulator 21 over to the drive 16a of the control diaphragm 14a of the gas turbine 4a.

Upon this, the control diaphragm 14a is closed to the position where it operates the switch 18a, breaking its normally closed contact and thus removing the signal from the drive 16a of the control diaphragm 14a, and closing the normally open contact, which switches the signal for closure from the isodromic regulator 21 over to the drive 16b of the control diaphragm 14b of the gas turbine 4b.

When the pressure of gas under the top shaft of the super-capacity blast furnace 1 rises, the isodromic regulator 21 produces a signal which enters the electrical control circuit 33 (FIG. 2) and through the normally closed contact of the switch 17b goes to the drive 16b (FIG. 1) of the control diaphragm 14b of the gas turbine 4b. The full opening of the control diaphragm 14b results in the operation of the switch 17b (FIG. 2), whose normally closed contact breaks and causes the removal of the signal from the drive 16b of the control diaphragm 14b. At the same time the normally open contact of the switch 17b closes, which makes it possible to transmit the signal for opening to the control diaphragm 14a of the gas turbine 4a (FIG. 1).

In a similar way, the operation of the switch 17a makes the signal of the isodromic regulator 21 go for opening the control diaphragm 14 of the gas turbine 4.

The operation of the switch 17 acts upon the drive 9 of the control throttle 7, and that of the switch 12 upon the drive 8 of the control throttle 6.

Whenever the stop diaphragm 15 of the gas turbine 4 is closed in an emergency, it operates the switch 20 (FIG. 2), breaking its normally closed contact and thus removing the signal of the isodromic regulator 21 from the electrical control circuit 32 in the line used for closing the control diaphragm 14 of the gas turbine 4 (FIG. 1). Simultaneously, the normally open contact of the switch 20 closes, which makes it possible, while the control giaphragm 14a of the gas turbine 4a is fully open and the switch 17a has been operated, to switch the signal of the isodromic regulator 21 over to the drive 9 of the control throttle 7 bypassing the drive 16 of the control diaphragm 14 of the gas turbine 4, which has broken down, and after closing the control throttle 7 until the switch 11 is operated, to transfer the signal of the isodromic regulator 21 to closing the control diaphragm 14a of the gas turbine 4a bypassing the control diaphragm 14 of the gas turbine 4.

The installation operates in the same way whenever the control diaphragm 15a of the gas turbine 4a is closed in an emergency and operates the switch 20a (FIG. 2).

The operation of the switches 19, 19a and 19b undergoes a similar effect whenever the respective gas turbine changes over to idle-run conditions, with the only difference being that the operation of the switches 19, 19a and 19b always involves the preceding operation of the switches 18, 18a and 18b, whose normally closed contacts break the electrical circuit 32, which controls the drives 16, 16a and 16b of the control diaphragms 14, 14a and 14b.

The tests of the installation according to the present invention confirmed its workability, increased output of electric power (by 5–10 percent), and higher accuracy of regulating the pressure of gas under the shaft top of the blast furnace.

What is claimed is:

1. An installation for controlling the gas pressure under the shaft top of a super-capacity blast furnace comprising:

a throttle assembly built in an outlet gas pipe ot said blast furnace having at least two control throttles arranged in parallel with respect to the gas flow and having separate drives for turning said control throttles;

at least two utility gas turbines connected to said outlet gas pipe of said blast furnace in parallel to each other and to said throttle assembly, each of said gas turbines having a control diaphragm and a stop diaphragm with separate drives for turning said diaphragms; a blast furnace gas heater mounted before each of said gas turbines for preheating the blast furnace gas fed to said gas turbines to a predetermined value;

first switches mounted on said drives for turning each control throttle of said throttle assembly and being actuatable upon closure of said control throttles;

second switches mounted on said drives for turning said control diaphragms of said gas turbines and being actuatable upon closure of said control diaphragms to a predetermined extent corresponding to a minimum flow rate of blast furnace gas through said gas turbine at which the gas preheating in said preheater is not cut off automatically;

third switches mounted on said drives for turning each control throttle, with the exception of a first control throttle, and each control diaphragm of said gas turbines operating when said control throttles and control diaphragms are completely open;

a pressure regulator having a sensor for measuring the pressure of said blast furnace gas under the shaft top and having a setter, said regulator being electrically connected to all said drives for turning said control throttles and control diaphragms, said regulator generating a signal to said drives to open said control throttles and control diaphragms when said blast furnace gas pressure under the shaft top exceeds a predetermined value, said regulator generating a signal to said drives to close said control throttles and control diaphragms when the pressure under the shaft top drops down below a specified limit; and an electrical control device which includes all contacts of said first, second and third switches and which transmits said signals from said pressure regulator to said separate drives for moving said control throttles and control diaphragms in a specified order, said pressure regulator acting on only one separate drive at any instant of time.

2. An installation for controlling the pressure of gas under the shaft top in a super-capacity blast furnace comprising: a throttle assembly built in a gas outlet pipe of said super-capacity blast furnace and having at least two control throttles arranged in parallel; separate drives for turning said control throttles of said throttle assembly; first switches cooperating with said control throttles and being actuatable by closure of said control throttles; at least two gas turbines connected to the gas outlet pipe of the super-capacity blast furnace in parallel with each other and with said throttle assembly; a gas heater being associated with each of said gas turbines, each heater being mounted before said gas turbine, and a control diaphragm and a stop diaphragm incorporated in each gas turbine; separate drives for moving said control diaphragms of said gas turbines; control means electrically connected with said separate drives for controlling the sequence of operation of said drives; a pressure regulator of blast-furnace gas pressure under the shaft top of the super-capacity blast furnace electrically connected through said control means with said separate drives for the control throttles of said throttle assembly and also with said separate drives for the control diaphragms of said gas turbines; second switches cooperating with said control diaphragms of said gas turbines incorporated in electrical control circuits of said pressure regulator, each of said second switches being actuatable on fully opening the respective control diaphragm of said gas turbine; third switches cooperating with each of said control throttles, except for the first control throttle, and incorporated in the electrical control circuits of said pressure regulator, said third switches being actuatable on full opening of the associated control throttles, said second and third switches being arranged to change over a drive signal on being actuated to open said control diaphragms and said control throttles from said pressure regulator in series to the respective separate drives for said control diaphragms of the gas turbines and then to said separate drives of said control throttles; fourth switches cooperating with each control diaphragm of the respective gas turbine and incorporated in the electrical control circuits of said pressure regulator connecting the latter with the separate drives for the control diaphragms of said gas turbines, said fourth switches being actuatable in the position of each control diaphragm of the respective gas turbine corresponding to a specified flow of gas through this turbine whose rate is slightly above that at which the respective blast-furnace gas heater is switched off, and said first and fourth switches being arranged to change over a drive signal to close said control diaphragms and said control throttles from said pressure regulator in series to the respective separate drives for the control diaphragms of said gas turbines according to the sequence of operation; said second switches of said gas turbine, which are operative on fully opening the respective control diaphragm, have a normally closed contact incorporated in the electrical control circuit of said pressure regulator on the line that serves for opening of the control diaphragm of a first gas turbine, and a normally open contact incorporated in a similar way in the electrical control circuit of said pressure regulator on its line that serves for opening the control diaphragm of a second gas turbine; said fourth switches, which operate when the position of the control diaphragm corresponds to a specified flow of gas, also have a normally closed contact incorporated into the electrical control circuit of said pressure regulator on the line for closing the control diaphragm of the second of said gas turbines, and a normally open contact incorporated into a similar line of the electrical control circuit of said pressure regulator on the line for closing the control diaphragm of a third of said gas turbines, which allows successive action of the pressure regulator on said separate drives for the control diaphragms of all said gas turbines to be carried out.

3. An installation as claimed in claim 2, wherein said first gas turbine is provided with a fifth switch mounted on its respective control diaphragm and operated on closing the respective control diaphragm to the position corresponding to idle-run conditions of the respective gas turbine, said fifth switch having a normally open contact which is incorporated in the electrical control circuit of said pressure regulator on a line for opening said control throttle in parallel with a normally open contact of a second switch operated on opening of the control diaphragm, and in series with the second normally open contact of a second switch operated on fully opening the control diaphragm of said second gas turbine, the second gas turbine having a fifth switch operating on changing over its gas turbine to idle-run conditions, said fifth switch having a normally open contact incorporated in the electrical control circuit on its line for opening the respective control diaphragm in parallel with the second normally open contact of said second switch that operates on fully opening of the diaphragm of said second gas turbine, and in series with the second normally open contact of said second switch that operates on fully opening the control diaphragm of said third gas turbine, and said third gas turbine is provided with a fifth switch operating on changing over said third gas turbine to idle-run conditions having a normally open contact incorporated in the electrical control circuit on its line for opening the respective control diaphragm of said second gas turbine in parallel with a normally open contact of said second switch that operates on fully opening the control diaphragm of said third gas turbine.

4. An installation as claimed in claim 2, wherein said first gas turbine is provided with a stop diaphragm having a respective sixth switch, operating at an emergency closure of the respective gas turbine and having two normally open contacts and one normally closed contact, the first normally open contact being incorporated into the electrical control circuit of said pressure regulator on a line for opening the respective control throttle directly in parallel with the contact of the idle-run fifth switch, the second normally open contact being incorporated in the electrical control circuit on its line for closing the control diaphragm of the second gas turbine in parallel with the normally open contact of the fourth switch that operates on closing the control diaphragm of said first gas turbine, and in series with the second normally open contact of said first switch that operates on closing the respective control throttle, and the normally closed contact of the sixth switch being directly incorporated into the electrical control circuit of said pressure regulator on the line for closing the control diaphragm of the first gas turbine by means of its separate drive; and the stop diaphragm of said second gas turbine being provided with a sixth switch also having two normally open contacts being incorporated in the electrical control circuit on its line for opening the control diaphragm of the first gas turbine directly in parallel with the normally open contact of the idle-run fifth switch of said second gas turbine, the second normally open contact being incorporated in the electrical control circuit on its line for closing the control diaphragm of said third gas turbine in parallel with the normally open contact of the fourth switch that operates on closing the control diaphragm of said second gas turbine, and in series with the second normally open contact of the fourth switch that operates on closing the control diaphragm of said first gas turbine, and the normally closed contact of said sixth switch being incorporated directly in the electrical control circuit on its line for closing the control diaphragm of said second gas turbine; and a stop diaphragm of the third gas turbine provided with a sixth switch having one normally open contact, incorporated in the electrical control circuit on its line for opening the control diaphragm of said second gas turbine directly in parallel with the normally open contact of the idle-run fifth switch for said third gas turbine, and one normally closed contact incorporated directly in the electrical control circuit on its line for closing the control diaphragm of said third gas turbine.

5. An installation as claimed in claim 3, wherein said first gas turbine is provided with a stop diaphragm having associated therewith a sixth switch operating at an emergency closure of the respective gas turbine and having two normally open contacts and one normally closed contact, the first normally open contact being incorporated into the electrical control circuit on its line for opening the respective control throttle directly in parallel with the contact of the idle-run fifth switch, the second normally open contact being incorporated in the electrical control circuit on its line for closing the control diaphragm of said second gas turbine in parallel with the normally open contact of the fourth switch that operates on closing the control diaphragm of said first gas turbine, and in series with the second normally open contact of the first switch that operates on closing the respective control throttle, and the normally closed contact of the sixth switch being directly incorporated in the electrical control circuit of said pressure regulator on the line for closing the control diaphragm of said first gas turbine, and said second gas turbine being provided with a stop diaphragm having associated therewith a sixth switch also having two normally open contacts and one normally closed contact, the first normally open contact being incorporated in the electrical control circuit on its line for opening the control diaphragm of the first gas turbine directly in parallel with the normally open contact of the idle-run fifth switch of said second gas turbine, the second normally open contact being incorporated in the electrical control circuit on its line for closing the control diaphragm of said third gas turbine in parallel with the normally open contact of the fourth switch that operates on closing the control diaphragm of said second gas turbine, and in series with the second normally open contact of the fourth switch that operates on closing the control diaphragm of said first gas turbine, and the normally closed contact of said sixth switch being incorporated directly in the electrical control circuit on its line for closing the control diaphragm of said second gas turbine; and said third gas turbine being provided with stop diaphragm having associated therewith a sixth switch having one normally open contact, incorporated in the electrical control circuit on its line for opening the control diaphragm of said second gas turbine directly in parallel with the normally open contact of the idle-run fifth switch for said third gas turbine, and one normally closed contact incorporated directly in the electrical control circuit on its line for closing the control diaphragm of said third gas turbine.

6. An installation for controlling the pressure of gas under the shaft top in a super-capacity blast furnace comprising:
- a throttle assembly built in a gas outlet pipe of said super-capacity blast furnace and having at least two control throttles arranged in parallel;
- a first control throttle switch for each control throttle which operates as its respective control throttle is closed, each of said first control throttle switches having a normally open contact and a normally closed contact;
- a second control throttle switch for each control throttle except a first control throttle which operates when its respective control throttle is fully open, said second control throttle switch having a normally open contact and a normally closed contact;
- at least three gas turbines connected to the gas outlet pipe in parallel with each other and with said throttle assembly;
- a heater mounted in said gas outlet pipe immediately before each of said gas turbines for heating the blast furnace gas;
- a control diaphragm for each of said gas turbines;
- a control diaphragm drive for each of said control diaphragms for moving said control diaphragms;
- a stop diaphragm for each of said gas turbines;
- a first switch for each of said gas turbines which operates when its respective control diaphragm is fully open, each of said first switches having a normally open contact and a normally closed contact;
- a second switch for each of said gas turbines which operates when its respective control diaphragm is closed to a position which corresponds to a flow of blast-furnace gas through the gas turbines whose rate is slightly above that at which the gas heaters are switched off, each of said second switches having a normally open contact and a normally closed contact;
- a third switch for each of said gas turbines which operates when its respective control diaphragm is closed to a position corresponding to an idle-run condition for that gas turbine, each of said third switches having a normally open contact;
- a fourth switch for each of said gas turbines which operates during an emergency closure of its respective stop diaphragm, each of said fourth switches having a normally open contact and a normally closed contact;
- a logic control unit electrically connected with each of said control throttle drives and with each of said control diaphragm drives for controlling the sequence of operation of said drives;
- an isodromic regulator of blast-furnace gas pressure under the shaft top of the super-capacity blast furnace electrically connected through said logic control unit with each of said control throttle drives and with each of said control diaphragm drives;
- a first electric control circuit for transmitting a signal to close each of said control throttles and each of said control diaphragms, said first electric control circuit being connected to said control throttle drive of a first control throttle through said normally closed contact of said first control throttle switch of said first control throttle, said first electric control circuit being connected to the control throttle drive of each successive control throttle through said normally closed contact of said first control throttle switch of said successive control throttle and said normally open contact of said first control throttle switch of the control throttle immediately before said successive control throttle, whereby when each control throttle is closed, its respective first control throttle switch is operated and the normally closed contact is opened, thus preventing further transmission of the signal to close to the control diaphragm of that control throttle, and the normally open contact is closed, so the control throttle drive of the next in order control throttle gets the signal to close the next in order control throttle, said first electric control circuit being connected to said control diaphragm drive of a first gas turbine through said normally open contact of said first control throttle switch of a last in order control throttle, said normally closed contact of said fourth switch of said first gas turbine and the normally closed contact of said second switch of said first gas turbine, said first electric control circuit being connected to said control diaphragm drive of each successive gas turbine through said normally closed contact of said fourth switch of said successive gas turbine, said normally closed contact of said second switch of said successive gas turbine and said normally open contact of said second switch of a gas turbine immediately before said successive gas turbine, said normally open contact of said second switch of said immediately before gas turbine being connected electrically in parallel with the series connected normally open contacts of said fourth switch of said immediately before gas turbine and of said second switch of a gas turbine immediately before said immediately before gas turbine, whereby when said last in order control throttle is closed, its first control throttle switch is operated, thus closing its normally open contact and allowing said signal to close the control diaphragm to be transmitted to said control diaphragm drive of said first gas turbine, when each successive control diaphragm is closed, its second switch is operated, thus opening its normally closed contact, and preventing further transmission of said signal to close to said control diaphragm drive of that gas turbine, and closing its normally open contact, and permitting transmission of said signal to close to a next in order gas turbine, whereby when said stop diaphragm of a gas turbine is closed, the signal to close will bypass said control diaphragm drive of that gas turbine, said signal to close being transmitted from said isodromic regulator through said logic control unit when the pressure of gas under the shaft top of the blast furnace decreases; and a second control circuit for transmitting a signal to open each of said control throttles and each of said control diaphragms, said second control circuit being connected to said control diaphragm drive of a last in order gas turbine through said normally closed contact of said first switch of said last in order gas turbine, said second control signal being connected to said control diaphragm drive of a next to last gas turbine through said normally open contact of said first switch of said last in order gas turbine, which is connected in parallel with said normally open contacts of said third and fourth switches of said last in order gas turbine, and said normally closed contact of said first switch of said next to last gas turbine, said second control circuit being connected to said control diaphragm drive of each successive, in reverse order, gas turbine through said normally open contact of said first switch of a gas turbine immediately after said successive gas turbine, which is connected in parallel through said normally open contact of said first switch of a gas turbine immediately after said immediately after gas turbine with said normally open contacts of said third and fourth switches of said immediately after gas turbine, and said normally closed contact of said first switch of said successive gas turbine, said second control circuit being connected to said control throttle drive of said last in order control throttle through said normally open contact of said first switch of said first gas turbine, which is connected in parallel through said normally open contact of said first switch of a second gas turbine with said normally open contacts of said third and fourth switches of said first gas turbine, and said normally closed contact of said second control throttle switch of said last in order control throttle, said second control circuit being connected to said control throttle drive of each successive, in reverse order, control throttle through said normally open contact of said second control throttle switch of a control throttle immediately after said successive control throttle, whereby when said control diaphragm of a gas turbine is opened, its first switch is operated, thus opening its normally closed contact, and preventing further transmission of the signal to open to said gas turbine, and closing its normally open contact, and allowing transmission of said signal to open to a next successive gas turbine, when said last in order control throttle is opened, by the closing of said normally open contact of said first switch of said first gas turbine when said control diaphragm of said first gas turbine is opened, its second control throttle switch is operated, thus opening its normally closed contact, and preventing further transmission of said signal to open to said last in order control throttle, and closing its normally open contact, and allowing transmission of said signal to open to a next successive control throttle, when said successive control throttle is opened the signal to close will likewise not be transmitted to said successive control throttle any longer and will be transmitted to a next successive control throttle, whereby the control diaphragms of each gas turbine are successively opened in reverse order followed by the successive opening in reverse order of the gas turbines, whereby when a gas turbine is in its idle-run condition the signal to open will bypass said control diaphragm drive of that gas turbine and be transmitted to the gas turbine next down the line, whereby when said stop diaphragm of a gas turbine is closed the signal to open will bypass said control diaphragm drive of that gas turbine and be transmitted to said control diaphragm drive of the gas turbine next down the line, said signal to open being transmitted from said pressure regulator through said logic control unit when the pressure of gas under the shaft top of the blast furnace increases.

7. The installation of claim 6, wherein each control throttle drive includes a magnetic amplifier and an electrical servomechanism.

8. The installation of claim 6, wherein each control diaphragm drive includes a magnetic amplifier, an electrical servomechanism and a hydraulic servomotor.

9. The installation of claim 8, wherein each control throttle drive includes a magnetic amplifier and an electrical servomechanism.

* * * * *